United States Patent
Broli et al.

(10) Patent No.: US 9,224,506 B2
(45) Date of Patent: Dec. 29, 2015

(54) METHOD OF MANUFACTURING NUCLEAR FUEL ELEMENTS AND A CONTAINER FOR IMPLEMENTING SUCH A METHOD

(75) Inventors: Jérôme Broli, Corbeil Essonnes (FR);
Jean-Marc Goyheneche, Pessac (FR);
Fabrice Mazaudier, Manosque (FR);
Francis Langlais, Lannemezan (FR)

(73) Assignee: Commissariate a l'Energie Atomique, Paris (FR)

( * ) Notice: Subject to any disclaimer, the term of this patent is extended or adjusted under 35 U.S.C. 154(b) by 974 days.

(21) Appl. No.: 12/519,133

(22) PCT Filed: Dec. 11, 2007

(86) PCT No.: PCT/EP2007/063645
§ 371 (c)(1),
(2), (4) Date: Mar. 22, 2010

(87) PCT Pub. No.: WO2008/071676
PCT Pub. Date: Jun. 19, 2008

(65) Prior Publication Data
US 2010/0296621 A1    Nov. 25, 2010

(30) Foreign Application Priority Data
Dec. 12, 2006    (FR) ..................................... 06 55443

(51) Int. Cl.
*G21C 3/64* (2006.01)
*G21C 3/28* (2006.01)
*G21C 3/62* (2006.01)
*G21C 21/02* (2006.01)

(52) U.S. Cl.
CPC .. *G21C 3/28* (2013.01); *G21C 3/62* (2013.01); *G21C 3/626* (2013.01); *G21C 21/02* (2013.01); *G21Y 2002/10* (2013.01); *G21Y 2002/202* (2013.01); *G21Y 2002/304* (2013.01); *G21Y 2004/40* (2013.01); *Y02E 30/38* (2013.01)

(58) Field of Classification Search
USPC .......................................... 376/411, 412, 414
See application file for complete search history.

(56) References Cited

U.S. PATENT DOCUMENTS

| | | | | |
|---|---|---|---|---|
| 1,620,996 A | * | 3/1927 | Caulkins | 223/101 |
| 3,122,595 A | * | 2/1964 | Oxley | 264/0.5 |
| 3,166,614 A | * | 1/1965 | Taylor | 264/0.5 |
| 3,361,638 A | * | 1/1968 | Bokros et al. | 376/411 |
| 3,463,702 A | | 8/1969 | D'Eye et al. | |

(Continued)

FOREIGN PATENT DOCUMENTS

| | | |
|---|---|---|
| EP | 0789365 A1 | 8/1997 |
| FR | 2744557 | 8/1997 |

OTHER PUBLICATIONS

International Search Report and Written Opinion in International Application No. PCT/EP2007/063645, mailed Apr. 10, 2008.

(Continued)

*Primary Examiner* — Jack W Keith
*Assistant Examiner* — Sean P Burke
(74) *Attorney, Agent, or Firm* — Nixon Peabody LLP

(57) ABSTRACT

A method of manufacturing nuclear fuel elements comprising the steps of placing nuclear fuel balls in the container made from ultra-porous material, applying a CVI to the container and removing the container. The container for manufacturing fuel elements comprising balls, and is produced from at least one ultra-porous material, for example carbon foam.

15 Claims, 3 Drawing Sheets

(56) References Cited

U.S. PATENT DOCUMENTS

| | | | |
|---|---|---|---|
| 3,657,137 A | | 4/1972 | Burke et al. |
| 3,833,470 A | * | 9/1974 | Gyarmati et al. ............. 376/426 |
| 3,945,884 A | * | 3/1976 | Freck ............................ 376/411 |
| 4,353,850 A | * | 10/1982 | MacDonald .................. 264/489 |
| 5,156,804 A | * | 10/1992 | Halverson et al. ............ 376/419 |
| 5,192,495 A | * | 3/1993 | Caldwell et al. .............. 376/417 |
| 5,254,374 A | * | 10/1993 | Devlin et al. ................. 427/553 |
| 5,498,442 A | * | 3/1996 | Lennartz ......................... 427/6 |
| 5,762,831 A | * | 6/1998 | Viallard et al. ............... 252/638 |
| 6,040,266 A | * | 3/2000 | Fay et al. ...................... 502/439 |
| 6,616,986 B2 | * | 9/2003 | Sherman ....................... 427/562 |
| 2002/0141932 A1 | * | 10/2002 | Klett et al. ................ 423/445 R |
| 2002/0149932 A1 | * | 10/2002 | Yano ............................ 362/223 |

OTHER PUBLICATIONS

French Preliminary Search Report in French Application No. FR 0655443, dated Sep. 25, 2007.

\* cited by examiner

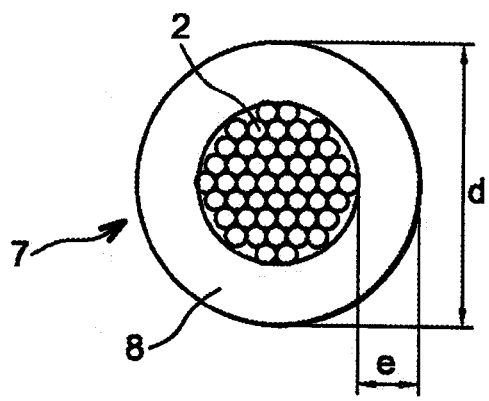
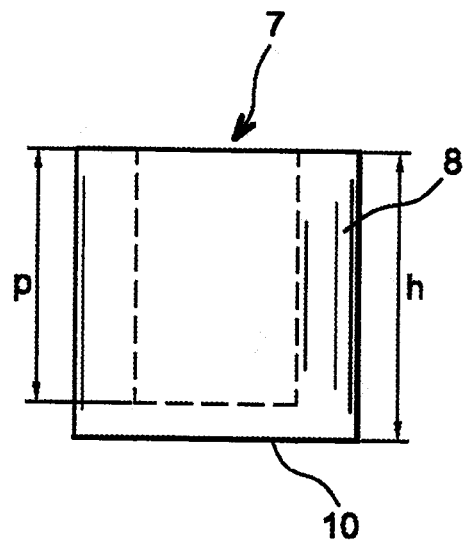
FIG. 1
FIG 2
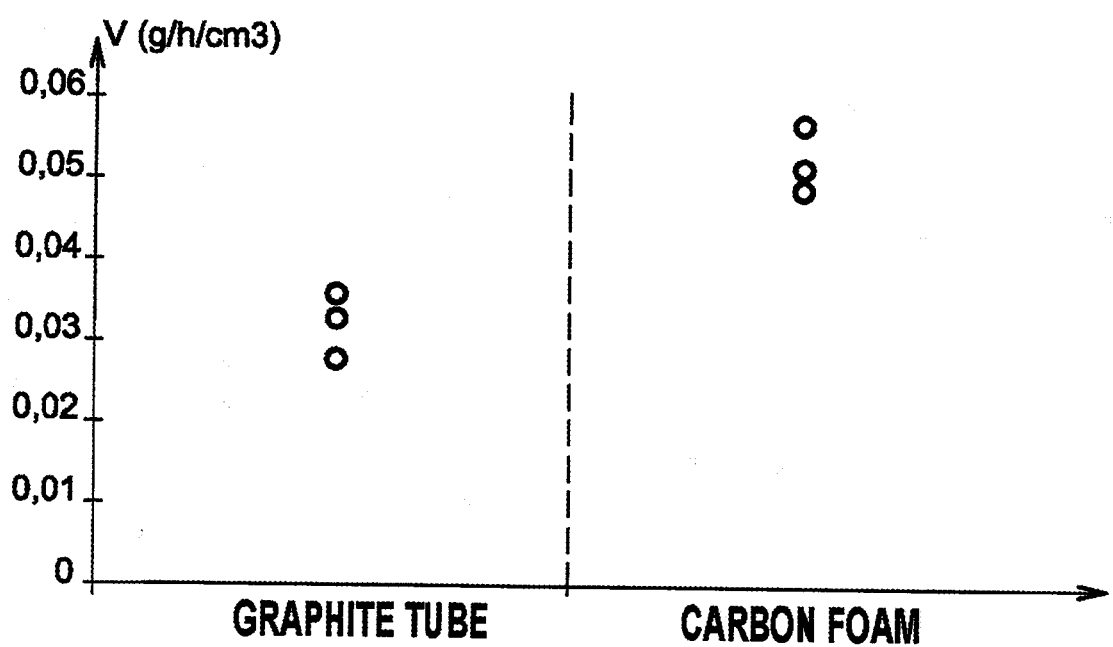
FIG. 3

METHOD OF MANUFACTURING NUCLEAR FUEL ELEMENTS AND A CONTAINER FOR IMPLEMENTING SUCH A METHOD

CROSS REFERENCE TO RELATED APPLICATIONS OR PRIORITY CLAIM

This application is a national phase of International Application No. PCT/EP2007/063645, entitled "METHOD FOR PRODUCING NUCLEAR FUEL ELEMENTS AND CONTAINER FOR REAISING SAID METHOD", which was filed on Dec. 11, 2007, and which claims priority of French Patent Application No. 06 55443, filed Dec. 12, 2006.

TECHNICAL FIELD AND PRIOR ART

The present invention relates to a method of manufacturing nuclear fuel elements, to a container for implementing such a method and to the elements obtained from such a method.

This fuel, referred to as new generation, participates in the development of new designs of reactors, known as fourth generation.

More particularly, the invention concerned is a method of manufacturing fuel elements in the form of a three-dimensional composite object comprising a stack of spherical ceramic particles, for example with the same diameter (monomode distribution) dispersed in a matrix produced by a chemical gas deposition, in particular by a chemical vapour infiltration (CVI) method.

In the context of the development of new designs freactors, known as fourth generation, a new type of installation is envisaged, functioning in a high temperature range—the temperature of the cooling fluid emerging from the reactor is above 800° C.—with a rapid neutron flux and a heat-transfer gas; these installations are referred to as gas cooled reactors (GCRs).

GCRs function with a rapid flux providing the possibility of reaching a conversion ratio greater than 1 (supergeneration) and/or a capacity to transmute waste (fission produces and minor actinides).

The heat transfer fluid is a gas, for example helium, enabling a sufficiently high temperature, compatible with the envisaged applications of electricity production with a high yield (for example in direct cycle) or hydrogen production, to be achieved at the discharge of the reactor.

A level of safety and reliability superior to that achieved in the systems of previous generations are sought.

To achieve satisfactory neutron conditions in operation, volume fractions of fuel material in the reaction medium greater than 20% to 25% are required, according to the density and enrichment with fissile material of the fuel.

The other materials involved in the composition of the structures occupying the remaining volume fraction have the property of neutron transparency in order not to degrade the flux in intensity and spectrum and to have thermomechanical characteristics suited to the operating temperatures of the reactors, which are close to 1200° C.

In addition, in order to reduce the risks of contamination of the heat transfer fluid in the event of ruptures of fuel elements, it is possible to reduce as far as possible the quantity of fission products liable to be released by elementary rupture following an initiating event. A dense and thermomechanically strong material is then sought.

Thus it is sought to produce, in the context of the development of GCRs, nuclear fuel elements having a content by volume of fissile atoms compatible with the neutron operating conditions and the volume power density of the reactive volume, ensuring heat transfer between the fuel material and the heat-transfer fluid, and finally providing confinement of the solid and gaseous fission product released by the fuel.

There exist various types of fuel that may be suitable.

Dispersed fuel, in which the fissile material in the form of a ball or stick is situated in an inert matrix fulfilling the thermomechanical functions and the retention of the fission products sought. The balls or sticks can be in the form of two-dimensional or three-dimensional coated wafers.

The particle fuel, in which the fissile material is formed from spheres coated with inert materials fulfilling the thermomechanical function and function of retaining the fission products; an analogy can be noted here with fuels in HTRs (High Temperature Reactors). In this type of fuel, the assembly of coated spheres forms coated wafers.

The solid-solution fuel, in which the fissile phase is a solid solution of actinides in the form of sheathed pellets, with the sheathing as a confinement barrier. This fuel is in the form of pellets, which will be stacked within a cylindrical sheath.

The dispersed fuel appears as the most suitable to correspond to the expectations stated above.

In the case of balls, the nuclear fuel elements comprise a random stack of balls in contact with one another within an inert matrix. These elements are in the form of cylinders referred to as CERCER/D3 compacts.

These compacts comprise a matrix of inert material of high density and great homogeneity, within which the distribution of balls is effected, this matrix satisfying the requirements of thermal and mechanical constraints and the constraint of retention of fission products.

It has become clear that silicon carbide is a very suitable material because of its thermal and mechanical behaviour and its neutron transparency. It is therefore particularly suited to the operating conditions of GCR reactors.

There is also sought, for producing these compacts, a compactness as close as possible to 100% and a short production time. In addition, maintenance of the chemical, structural, mechanical and thermal characteristics of the fissile compound and more broadly of the fuel is also sought.

When the fuel element is produced, it is greatly desirable to use production methods for the silicon carbide matrix requiring temperatures below the maximum operating temperatures of the GCR reactors, estimated at the present time at 1200° C. This temperature constraint for example completely prevents the use of conventional production methods by powder sintering since the sintering temperature is between 1800° C. and 2000° C. In addition, the composition, the structure and the microstructure of the fuel are more easily kept at moderate temperatures. Moreover, it is preferable to avoid mechanical constraints on the balls, and thus operations of machining the compact therefore appear inappropriate.

The patent FR 2744557 describes the production of a dispersion of fuel bails of 10 µm within a matrix produced by sintering so as to obtain a space between the matrix and the fuel.

The U.S. Pat. No. 3,657,137 describes the production of three-dimensional cylindrical composite objects consisting of particles of UO2 dispersed within a porous ceramic matrix, also produced by sintering. According to circumstances, the distribution of the balls may be monomodal (that is to say composed of particles of the same size) or bimodal (that is to say composed of particles of two different sizes), the latter making it possible to increase the percentage by volume of fissile material within the fuel, element.

In the case of GCR reactors, a production method is therefore sought allowing the production of CERCER/3D compacts in which the temperature is below a critical temperature and the duration of manufacture is relatively short and which does not apply mechanical stresses to the nuclear fuel balls, or only a little.

The so-called "fluid phase" methods, in particular chemical vapour deposition (CVD) methods appear to be particularly suitable since they meet the constraints of limit temperature (the temperatures used do not exceed 1000° C.-1050° C.) and do not apply mechanical stresses.

When the substrate on which the chemical species is deposited is porous, the CVD method is termed chemical infiltration method (CVI, standing for Chemical Vapour Infiltration).

The CVI method is used industrially for the densification of composite materials woven in two or three dimensions, for example in the aeronautical sector, in which the characteristic dimensions of the inter-fibre spaces to be filled in are a few tens of micrometers. This method comprises the steps of temperature decomposition of one or more gaseous precursors (homogeneous reactions), infiltration and then adsorption of the decomposed precursors within a porous substrate, which causes the formation of a solid (heterogeneous reactions) responsible for its progressive densification.

One of the main difficulties of the CVI method is the preferential adsorption of the gaseous mixture on the first surfaces of the porous substrate encountered. This phenomenon is responsible for a significant densification of the regions adjoining the surface and cause a reduction in reactive species in the gaseous phase as the core of the structure to be densified is approached. This reduction in reactive species responsible for a densification gradient.

The inventors have thought to apply the CVI method used in a completely different field, to the manufacture of nuclear fuel elements from ceramic balls, in particular in order to densify a stack of balls.

However, the CVI methods of the prior art do not make it possible to manufacture objects formed by stack of balls. This is because, the stack of balls not being self-supporting, it is not possible to produce for example cylindrical objects.

The use of a container for maintaining the balls in a given form at least during part of the densification causes a heterogeneous densification because of a unidirectional infiltration of the gases.

In addition, it is preferable for the containers used for forming the stack of balls to be chemically inert, in order to avoid interactions of the diffusive type between the container and the balls.

In addition, the densified element may adhere to the container.

A method of producing nuclear fuel elements from nuclear fuel balls is known from the document U.S. Pat. No. 3,833,470. The bails are disposed in a receptacle comprising orifices in its bottom for allowing the introduction of chloromethylsilanes in the receptacle in order to fix the balls together. However, the nuclear fuel element comprises both the receptacle and the agglomerated balls. Consequently the quantity of fissile material in the nuclear fuel element with respect to its volume is reduced because of the presence of the container. This reduction is reproduced as many times as there are elements. There is therefore an appreciable loss of power.

Consequently one aim of the present invention is to offer a method of producing nuclear fuel elements comprising balls in a matrix, for example silicon carbide, by a CVI method.

Another aim of the present invention is to offer a method of manufacturing nuclear fuel elements based on material in the form of balls making it possible to obtain a high densification of said elements and a quantity of fissile material per unit volume.

Another aim of the present invention is to offer a method of manufacturing nuclear fuel elements having a homogenous density.

Another aim of the present invention is to offer a method of manufacturing nuclear fuel elements based on material in the form of balls, where the temperature reached during densification is below 1200° C., and not applying any mechanical stress to the nuclear fuel balls.

DISCLOSURE OF THE INVENTION

The aims stated above are achieved by the use of a container intended to be removed, this being able to provide a maximum filling with balls, and formed from a material offering sufficient mechanical strength to contain the balls and sufficiently porous to allow a good CVI, and being able to be removed easily in order to avoid damaging the content.

To this end, the container is produced from ultra-porous material, in particular a container made from graphite foam in which the balls are disposed in order to undergo chemical vapour densification. The porous structure of the container allows three-dimensional infiltration of the gaseous mixture. Thus the entire surface of the stack of balls is exposed to the gaseous mixture. Access of the precursors to the centre of the stack of balls is facilitated and the densification is made more homogeneous and higher.

In the case of a container formed by a dense tube of the graphite tube type, the infiltration takes place solely in one direction, causing heterogeneous densification.

In other words, there is provided a container able to allow the gaseous mixture to pass in three directions in space, in particular silicon carbide, and able to hold the balls in a given form. Thus the gaseous mixture is deposited evenly on the nuclear fuel balls. In this way a preferential densification direction and the appearance of heterogeneous densification are avoided.

The ultra-porous container according to the invention has sufficient mechanical strength to withstand a stack of ceramic balls and is sufficiently fragile to allow its destruction with a view to its removal.

The ultra-porous container has very good chemical inertia, that is to say it does not react, or reacts only a little, with the ceramic balls with which it is filled and with the precursors of the vapour infiltration.

It also has very good thermal inertia, and thus is not sensitive or only a little sensitive to the high temperature necessary for densification.

The container also comprises properties of low adhesion vis-á-vis the balls and the matrix.

The subject matter of the present invention is therefore mainly a method of manufacturing nuclear fuel elements from ceramic balls, comprising the steps of:

a) placing the ceramic nuclear fuel balls in a container made from ultra-porous material, b) densification by chemical vapour infiltration of at least one chemical species, removal of the container.

Advantageously, the container is removed during step b), for example by polishing or machining.

During step b), infiltration of an organometallic precursor of the MethyiTrichloroSilane (MTS) type can be provided, leading to the obtaining of a silicon carbide matrix.

In an example embodiment, step b) comprises a first densification substep of 15 hours before the removal of the container and a second densification substep of 15 hours after the removal of the container. Densification takes place at a temperature of approximately 1000° C.

Another subject matter of the present invention is a nuclear fuel element obtained by the method according to the present invention.

Advantageously, the nuclear fuel element has a compactness of at least 90%.

In a particularly advantageous example embodiment, the balls all have substantially the same diameter.

The nuclear fuel element according to the invention comprises ceramic balls in a silicon carbide matrix.

Another object of the present invention is a container for implementing the method according to the present invention, the container being produced from at least one ultra-porous material.

The ultra-porous material advantageously has a porosity of around 98%.

Advantageously, the container comprises pores having a diameter of between 100 µm and 600 µm in order to allow the gases to pass and to afford good infiltration.

For example, the porous material forming the container is a carbon foam.

Provision can be made for applying, inside the container, a coating that is anti-adherent vis-á-vis a densification chemical species.

The container has for example a cylindrical shape with a circular cross section comprising a bottom at one end.

In one example embodiment, the container has an outside diameter of between 9 mm and 11 mm, a height of between 12 mm and 14 mm and a wall thickness of between 0.4 mm and 1 mm, and a depth of around 10 mm.

The container can be produced by manufacturing using a master mould.

BRIEF DESCRIPTION OF THE DRAWINGS

The present invention will be understood better with the help of the following description and the accompanying drawings, in which:

FIG. 1 is a plan view of a container according to the present invention filled with balls.

FIG. 2 is a side view of the container according to the present invention without the balls, FIG. 3 is a comparative graphical representation of the weight-increase speeds in g/h/cm$^3$ in the case of a container according to the present invention and the case of a container formed by a graphite tube.

DETAILED DISCLOSURE OF PARTICULAR EMBODIMENTS

In order to show the effectiveness of the method according to the invention and of the container according to the invention, the following description will present the results of a method according to the present invention and those of a method using a container made from dense graphite.

Figure 7:
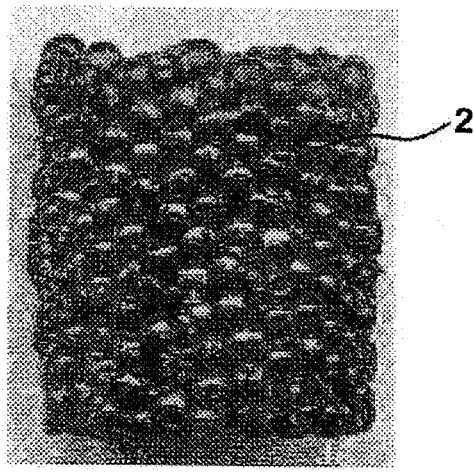
FIG. 7 is a schematic representation of a nuclear fuel element according to the present invention.

In FIG. 7, a nuclear fuel element can be seen obtained by the method according to the present invention comprising ceramic nuclear fuel balls 2, for example made from uranium oxide, embedded in a matrix holding together the balls so as to form a self-supporting element.

The balls can have all substantially the same diameter, for example 1.2 mm.

Advantageously, it can be envisaged using balls with different diameters, for example two diameters with a ratio of 10 between the two. This has the advantage of making it possible obtain a high density, the balls of the smaller diameter filling in the free spaces between the balls with the larger diameter.

The nuclear fuel balls comprise for example a fissile core of uranium oxide or uranium carbide or nitride and/or plutonium carbide or nitride. For reasons of safety, a confinement barrier is provided, which may consist of tight refractory coatings deposited on these fissile cores, such as SIC or other inert ceramic.

The method according to the present invention makes provision for depositing the matrix around the balls 2 by chemical vapour infiltration CVI.

According to the present invention, provision is made to dispose the balls in a container and to subject the ultra-porous container filled with at least some of the balls to a CVI process.

The method according to the present invention comprises the steps of:
putting the balls 2 in the ultra-porous container 7,
inserting the container 7 containing the balls 2 in a CVI reactor applying a chemical vapour infiltration to the container loaded with balls,
removing the container 7.

The method according to the invention and the container used will now be detailed.

According to the present invention, a container 7 shown in FIGS. 1 and 2 comprises a cylindrical wall 8 with a circular cross section and a bottom 10 so as to delimit a volume for receiving the balls 2.

Container 7 is produced from an ultra-porous material.

In the present application ultra-porous material means material having pores able to allow gaseous precursors to pass, such as silicon carbide, and therefore not forming a barrier. The pores advantageously have a diameter of between 100 µm and 600 µm typically. The porosity of the material is for example around 98%.

It should be noted that a person skilled in the art cannot establish a direct correlation between the size of the pores of the material and the porosity of the material, and cannot therefore deduce that a material having large pores necessarily has a high porosity.

The diameter of the pores is determined to allow the gases to pass and permit good infiltration, to retain and contain the objects, in particular balls, and to allow easy removal of the container.

In the example shown, the container 7 is produced from foam, advantageously carbon foam.

The container can be produced entirely from foam, and the container is then cut in a single piece in a foam block.

It can also be envisaged producing a foam tube and attaching a bottom, for example made from carbonaceous fabric.

The foam used for the tests comprises alveoli measuring approximately 400 µm (60 ppi (pores per inch)), this size of alveoli being sufficient to hold the balls 2, since the balls 2 have a diameter greater than the size of the alveoli. In addition, this size of alveolus allows homogeneous infiltration of the precursor gases in the three directions in space without causing the total filling of the alveoli.

The carbon foam container has sufficient mechanical strength to withstand the load of the stack of ceramic balls. The container is however sufficiently fragile to enable it to be removed without damaging the formed compact of balls and silicon carbide. The foam is relatively friable and this can then easily be worked. Thus the containers can be cut by means of a sharp-edged steel master mould, and a container is obtained to the required dimensions.

The carbon foam can comprise solid amorphous carbon strands.

In the example shown, the container has an outside diameter d between 9 mm and 11 mm, a height h of between 12 mm and 14 mm, a wall thickness e of between 0.4 mm and 1 mm and an inside depth p of around 10 mm.

The dimensions of the container can be planed by polishing. The small thickness of the side wall minimises the consumption of precursor gases generated by the deposit appearing within the foam alveoli.

The foam is chosen so as to be refractory.

In addition, a foam transparent to the gaseous precursors of the CVI is sought.

In addition, the foam is chosen so as to be inert under the manufacturing conditions of the nuclear fuel elements in order to reduce the risks of reaction between the foam and the nuclear fuel balls and/or the gaseous precursors.

Advantageously, the foam is able to be shaped easily.

Other refractory materials offering good properties of permeability and porosity could also be suitable.

A container comprising a dense graphite tube forming the wall 8 and a bottom 10 are made from carbonaceous tissue, bonded to one end of the tube by means of a carbon adhesive, has also been used. This will be designated "graphite tube".

Advantageously, a layer of anti-adherent material, for example powdery boron nitride, is deposited inside the container 7 in order to reduce the risks of adhesion between the element and the container 7.

The graphite tube also comprises a layer of anti-adherent material.

The balls are next disposed inside the container 7/graphite tube, and then introduced into a CVI reactor. The container and the graphite tube are filled with balls to a height of approximately 10 mm.

Advantageously, the container 7 and graphite tube are deposited on a sample holder consisting of a graphite rod at the end of which a mullite zirconium grid marked out in a honeycomb has been placed.

The compactness of the set of balls 2 before CVI has been estimated and this is approximately 50% and the size of the cavities present between the balls is between 300 μm and 400 μm. It is not necessary to provide a distribution by vibrocompacting, however it is possible to provide such a step before the placing of the container in the reactor.

By virtue of the present invention, a considerable gain in power per unit volume is obtained, procured by the elimination of the container.

For example, it is possible to define a unit of power per unit volume by the ratio between the quantity of fissile material contained in the fuel element and its volume.

In the case of the present invention, since the container is eliminated, the fuel element is composed only of agglomerated fissile material, and the unit of power per unit volume is equal to the concentration per unit volume of fissile material of the content.

On the other hand, in the case of a nuclear fuel element of the prior art for which the container is kept, this power per unit volume is reduced. This is because, for the same total volume, the quantity of fissile material is reduced.

For example, in the case of a container 11 mm high, 12 mm in diameter and 1 mm thick, the power per unit volume is equal to 0.63 times the concentration per unit volume in fissile material of the content. Consequently, the consequence of the non-removal of the mould is a reduction of 37% in the power per unit volume.

The gain in power per unit volume obtained by virtue of the present invention is therefore considerable.

Figure 5:
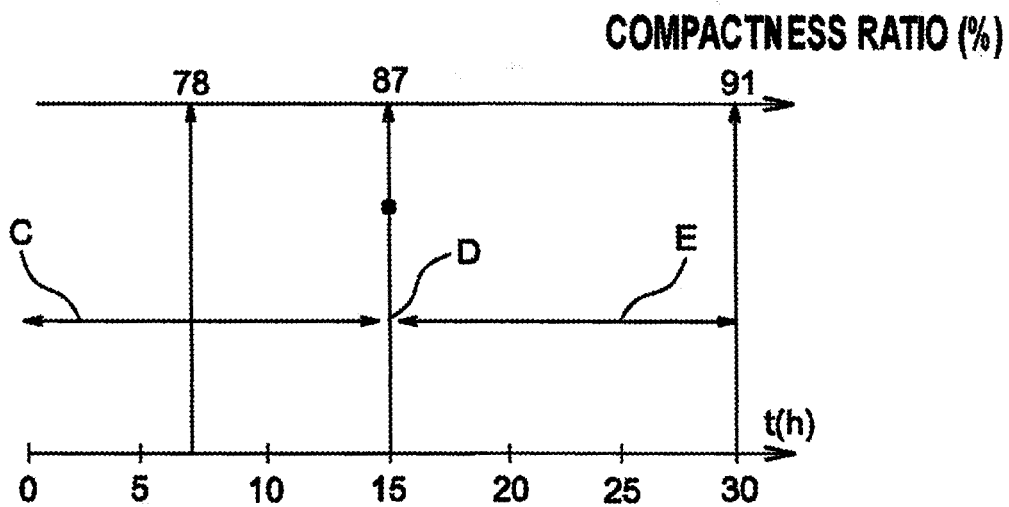
FIG. 5 is a schematic representation of an operating mode of a step of chemical vapour infiltration of the method according to the invention as a function of time and the compactness ratio.

A description will now be given in detail of the CVI step in FIG. 5 with a carbon foam container. The manufacture of an element from ceramic balls contained in a carbon tube comprises the same steps.

Advantageously, the matrix contained in the balls is made from silicon carbide. To produce such a matrix, use is made for example of MethylTrichloroSilane (MTS) as an organometallic precursor.

However, any other material able to provide cohesion of the balls with each other can be suitable and fulfil the operating conditions of GCR reactors, in particular concerning its thermal and mechanical behaviour and its neutron transparency. For example, zirconium carbide ZrC or titanium nitride TiN may be suitable.

In the example described, the CVI is formed with a temperature of around 1000° C., a pressure P=9 to 13 kPa, a ratio $\alpha = P_{H2}/P_{MTS}=4$ to 9, and a total throughput of incoming precursor lying between 31 and 35 liters/hour. The pressure $P_{MTS}$ is the input pressure of the MTS.

Advantageously, the CVI step is performed in two stages, a first one during which the balls are disposed in the container, and a second during which the stack of balls is no longer in the container 7.

For 15 hours (step C), there is densification of the stack of balls contained in the container by CVI.

After the first 15 hours of densification, the stack contained in the carbon foam container 7 has a compactness level estimated at 87% as against 82% for the stack produced with graphite tube.

During step D, the container 7 is removed by polishing or cutting. This is because the stack densified during step C is sufficiently consolidated and strong from the mechanical point of view to be self-supporting. The container can therefore be removed.

Removal of the container makes it possible advantageously to reduce the densification time.

In addition, removal of the container at the end of densification could pose a problem.

During step E, the densification of the stack continues with an additional step of 15 hours under the same densification conditions. The compact obtained then has a compactness of 91% in the case of the use of a carbon foam container during the first densification step and 88% in the case of the use of a container in the form of a graphite tube 107.

The steps may last for more or less than 15 hours, their duration being adapted according to the material to be injected and/or the container and/or the balls. The two densification steps can also have different durations.

It can be seen that, for the same densification time (15 hours), the weight-increase rates in relation to the total initial mass or volume of balls in the stack contained in a carbon foam are superior to those of the stack contained in the graphite tube. However, for the same infiltration conditions, the weight-increase speeds V of the stack in relation to the initial mass or volume of the balls represent the state of progress of densification. These weight-increase speeds shown in FIG. 3 do not take account of the weight increases of the different containers.

Figure 4:
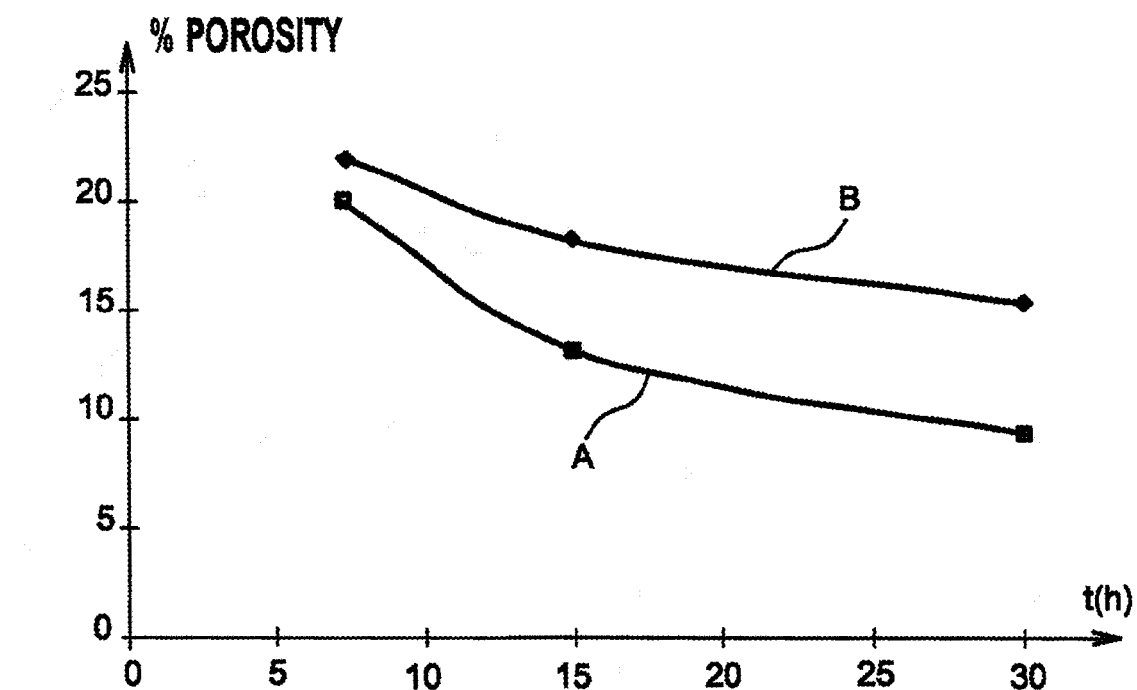
FIG. 4 is a graphical representation of the evolution in porosity of a nuclear fuel element according to the present invention as a function of time in hours using a container according to the invention and a container formed by a graphite tube.

It appears that the use of carbon foam as a container for the densification of stacks of balls by CVI increases the densification speed by virtue of the infiltration of the precursor gases in the three directions in space. This is also confirmed by the change in the porosity percentage within the stacks during the first 15 hours of densification shown in FIG. 4. The curve A represents the change in the porosity for a stack of balls in a carbon foam container 207 while the curve B represents the change in the porosity for a stack of balls in the graphite tube.

It will be observed that this percentage decreases more rapidly in the case of the use of carbon foam.

In addition, it has been found that the use of containers made from porous material, in particular carbon foam, minimises the densification gradients.

Figure 8:
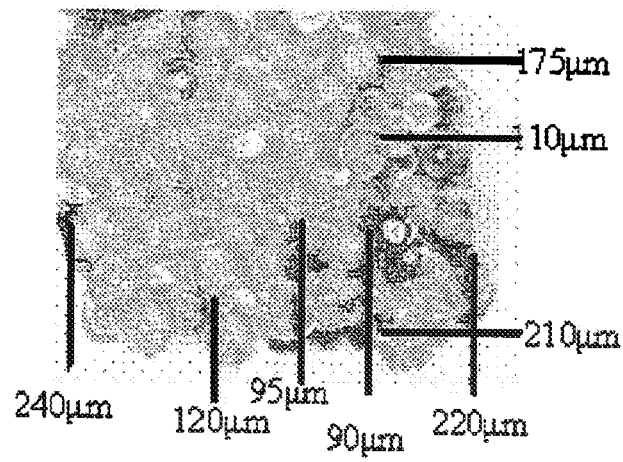
FIG. 8 shows the measurements of thicknesses SIC of a nuclear fuel element according to the present invention.

FIG. 8 shows the thickness of silicon carbide within the stack obtained after 30 hours of densification, the first 15 hours of densification having taken place in the carbon foam container. A relative homogeneity of the thickness of silicon carbide can be observed, this varying between 90 μm and 240 μm.

Figure 6:
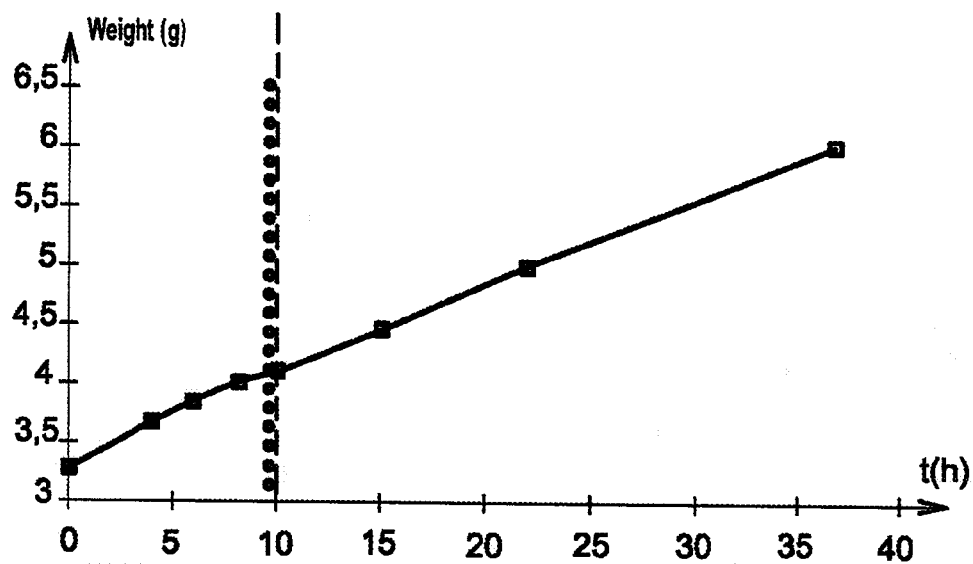
FIG. 6 is a graphical representation of the evolution in weight increase in grams of the element according to the present invention as a function of time in hours.

No recording of the thicknesses within the stack densified by means of the graphite tube has been able to be made after 15 hours since the preferential deposits on the surface of the stack caused by the unidirectional infiltration of the precursor gases have blocked the access ways. In the light of FIG. 6, a reduction in the weight increase per unit of time can be seen. The weight increase has been recorded along with the densification, however the blocking of the pores present close to the surface causes a reduction in the surface accessible to gases. As from approximately 10 hours of densification, the majority of the surface pores are closed and the weight increase per unit of time becomes constant and related solely to the deposit on the external surface of the sample.

In the case of the use of carbon foam, the surface pores are not blocked and the same applies to the alveoli of the carbon foam.

The nuclear fuel elements obtained by this method with the containers whose dimensions were specified previously have a height between 10 mm and 13 mm and a diameter of approximately 10 mm.

The method according to the present invention therefore makes it possible to produce compact elements formed from a non-self-supporting stack of balls, said compact elements having a high compactness, in particular greater than 90%, and reduced heterogeneity.

The present invention makes it possible to apply a highly efficient CVI process for reducing composite objects, for the manufacture of objects of variable geometry from stacks of elements that are not self-supporting, such as for example ceramic balls.

The present invention applies in particular to the manufacture of nuclear fuel elements.

The invention claimed is:

1. Method of manufacturing nuclear elements from ceramic balls comprising:
   a) placing ceramic nuclear fuel balls in a container made from ultra-porous material in order to form a stack of nuclear fuel balls,
   b) performing densification of the stack of nuclear fuel balls by chemical vapour infiltration of at least one chemical species, wherein performing densification comprises passing the at least one chemical species in vapor form by three-dimensional diffusion through the bulk of the ultra-porous material, and wherein the chemical vapour infiltration is three-dimensional, such that the entire surface of the stack of nuclear balls is evenly exposed to the chemical species and such that a simultaneous infiltration takes place in the whole stack of nuclear balls, and
   c) removing the container;
   wherein the nuclear fuel element thus produced has a composite structure comprising a stack of nuclear fuel balls, such that the interstitial space between the nuclear fuel balls is at least partially filled with a matrix formed by said at least one chemical species, so that the nuclear fuel balls are held together by the matrix as a single solid unit and the compactness of the nuclear fuel element is of at least 90%.

2. Method according to claim 1, in which step c) takes place during step b).

3. Method according to claim 1, in which step b) comprises the infiltration of an organometallic precursor of the MethylTrichloroSilane (MTS) type leading to the obtaining of a silicon carbide matrix.

4. Method according to claim 1, in which the removal of the container during step c) takes place by polishing or machining.

5. Method according to claim 1, in which step b) comprises a first densification substep of 15 hours before the removal of the container and a second densification substep of 15 hours after the removal of the container and takes place at a temperature of approximately 1000° C.

6. Nuclear fuel element obtained by:
   a) placing ceramic nuclear fuel balls, comprising fissile material, in a container made from ultra-porous material in order to form a stack of nuclear fuel balls,
   b) performing densification of the stack of nuclear fuel balls by chemical vapour infiltration of at least one chemical species, wherein performing densification comprises passing the at least one chemical species in vapor form by three-dimensional diffusion through the bulk of the ultra-porous material, such that the entire surface of the stack of nuclear balls is evenly exposed to the chemical species and such that a simultaneous infiltration takes place in the whole stack of nuclear balls, and
   c) removing the container;
   wherein the nuclear fuel element has a composite, such that the interstitial space between the nuclear fuel balls is at least partially filled with a matrix formed by said at least one chemical species, so that the nuclear fuel balls are held together by the matrix as a single solid unit,
   wherein the unit of power per unit of volume is proportional to the concentration per unit volume of fissile material of the nuclear fuel element, the unit of power per unit of volume being proportional to the ratio between the quantity of fissile material contained in the fuel element and the volume of the fuel balls, and
   wherein the nuclear fuel element has a compactness of at least 90%.

7. Nuclear fuel element according to claim 6, in which the balls all have substantially the same diameter.

8. Nuclear fuel element according to claim 6, in which the step b) comprises the infiltration of an organometallic precursor of the MethylTrichloroSilane (MTS) type leading to the obtaining of a silicon carbide matrix.

9. Container made from ultra-porous material for implementing a method of manufacturing nuclear elements from ceramic balls comprising the steps of:
   a) placing ceramic nuclear fuel balls in the container in order to form a stack of the ceramic balls, b) densification of the stack of the ceramic balls by chemical vapour infiltration of at least one chemical species, comprising passing the at least one chemical species in vapor form by three-dimensional diffusion through the bulk of the ultra-porous material, such that the entire surface of the stack of the ceramic balls is evenly exposed to the chemical species, and c) removal of the container, said container comprising a coating that is anti-adherent vis-à-vis a densification chemical species.

10. Container according to claim 9, in which the ultra-porous material has a porosity of around 98%.

11. Container according to claim 9, in which the porous material is a carbon foam.

12. Container according to claim 9, cylindrical in shape with a circular cross section comprising a bottom at one end.

13. Container according to claim 11, with an outside diameter of between 9 mm and 11 mm, a height of between 12 mm and 14 mm, a wall thickness of between 0.4 mm and 1 mm, and an internal depth of around 1 mm.

14. Container according to claim 9, produced by machining.

15. The container of claim 9, wherein the densification chemical species is powdery boron nitride.

* * * * *